(12) United States Patent
Wu et al.

(10) Patent No.: US 10,531,056 B2
(45) Date of Patent: Jan. 7, 2020

(54) PROJECTOR, PROJECTING SYSTEM AND TRANSMISSION DELAY DETECTION METHOD THEREOF

(71) Applicant: Coretronic Corporation, Hsin-Chu (TW)

(72) Inventors: Jian-Jiun Wu, Hsin-Chu (TW); Chih-Hsun Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/420,174

(22) Filed: May 23, 2019

(65) Prior Publication Data

US 2019/0373231 A1 Dec. 5, 2019

(30) Foreign Application Priority Data

May 29, 2018 (CN) .......................... 2018 1 0531988

(51) Int. Cl.
*H04N 9/31* (2006.01)
*H04N 17/00* (2006.01)
(52) U.S. Cl.
CPC ......... *H04N 9/3194* (2013.01); *H04N 9/3147* (2013.01)
(58) Field of Classification Search
CPC .. H04N 9/3194; H04N 9/3147; H04N 9/3197; H04N 9/31; H04N 17/04; H04N 17/045; H04N 17/02; H04N 17/00; H04N 17/004

USPC ................. 348/177, 180, 189, 192–194, 744
See application file for complete search history.

(56) References Cited

U.S. PATENT DOCUMENTS

| | | | |
|---|---|---|---|
| 2006/0078305 A1 | 4/2006 | Arora et al. | |
| 2008/0152019 A1 | 6/2008 | Lee | |
| 2010/0238297 A1* | 9/2010 | Gou | ...................... G06F 3/1454 348/181 |
| 2011/0043640 A1* | 2/2011 | Zinevich | ................... G01S 5/06 348/192 |

* cited by examiner

*Primary Examiner* — Sherrie Hsia
(74) *Attorney, Agent, or Firm* — JCIPRNET

(57) ABSTRACT

A projector, a projecting system and a transmission delay detection method thereof are provided. The projector includes an image processor and a delay calculator. The image processor, in a test mode, receives a first test image signal through an input end during a first time period, generates a first processed image signal through an output end, receives a second test image signal through the input end during a second time period, and generates a second processed image signal through the output end. The delay calculator detects a first time point at which the input end of the image processor receiving the first test image signal and a second time point at which a signal on the output end of the signal processor to translate from the first processed image signal to the second processed signal, and generates a first transmission delay according to the first and second time points.

23 Claims, 6 Drawing Sheets

PROJECTOR, PROJECTING SYSTEM AND TRANSMISSION DELAY DETECTION METHOD THEREOF

CROSS-REFERENCE TO RELATED APPLICATION

This application claims the priority benefit of China application serial no. 201810531988.2, filed on May 29, 2018. The entirety of the above-mentioned patent application is hereby incorporated by reference herein and made a part of this specification.

BACKGROUND OF THE INVENTION

Field of the Invention

The disclosure relates to a projector, a projecting system, and a transmission delay detection method thereof, and in particular, to a projector, a projecting system, and a transmission delay detection method thereof that can calculate transmission delays of image-related signals.

Description of Related Art

In a projector, an image signal received through an input end generally undergoes one or more image processing operations performed by a chip, and the processed image signal is transmitted outward through an output end. The image processing operations mentioned above result in an undetermined delay in the time point at which the projector actually generates a projection image. In a single-device application, a case where the audio and video cannot be synchronized may arise. In a multiple-projector application, it is likely that the difference in the image projection delays generated among the projectors may result in an issue of unsynchronized images, which significantly affects the quality.

In the related art, to address the unsynchronized state mentioned above, a user can only manually adjust the projectors in advance to reduce the impact caused by unsynchronized images. However, such method takes the user more time for calibration and causes inconvenience in use.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projector, a projecting system, and a transmission delay detection method that can calculate transmission delays of image-related signals and adjust the time of image output.

Other purposes and advantages of the invention may be further understood according to the technical features disclosed herein.

To achieve one, part, or all of the foregoing purposes or other purposes, a projector provided in an embodiment of the invention includes an image processor and a delay calculator. In a test mode, the image processor receives a first test image signal through an input end during a first time period to generate a first processed test image signal at an output end according to the first test image signal, and receives a second test image signal through the input end during a second time period to generate a second processed test image signal at the output end according to the second test image signal. The delay calculator is coupled to the input end and the output end of the image processor. The delay calculator detects a first time point at which the input end of the image processor receives the second test image signal, detects a second time point at which a signal on the output end of the image processor translates from the first processed test image signal to the second processed test image signal, and generates a first transmission delay according to the first time point and the second time point. The first time period occurs before the second time period, and the first test image signal and the second test image signal are different from each other.

To achieve one, part, or all of the foregoing purposes or other purposes, a projecting system provided in an embodiment of the invention includes a plurality of projectors and a controller. The plurality of projectors respectively generate a plurality of divided images, and the plurality of divided images are combined into a merged image. Each of the projectors includes an image processor and a delay calculator. In a test mode, the image processor receives a first test image signal through an input end during a first time period to generate a first processed test image signal at an output end according to the first test image signal, and receives a second test image signal through the input end during a second time period to generate a second processed test image signal at the output end according to the second test image signal. The delay calculator is coupled to the input end and the output end of the image processor. The delay calculator detects a first time point at which the input end of the image processor receives the second test image signal, detects a second time point at which a signal on the output end of the image processor translates from the first processed test image signal to the second processed test image signal, and generates a first transmission delay according to the first time point and the second time point. The first time period occurs before the second time period, and the first test image signal and the second test image signal are different from each other. The controller is coupled to the projectors, generates a delay control signal according to the first transmission delay generated by each of the projectors, and adjusts an image signal transmission delay of each of the image processors according to the delay control signal.

To achieve one, part, or all of the foregoing purposes or other purposes, a transmission delay detection method provided in an embodiment of the invention includes the following steps. In a test mode, an image processor is provided to receive a first test image signal through an input end during a first time period to generate a first processed test image signal at an output end according to the first test image signal, and receive a second test image signal through the input end during a second time period to generate a second processed test image signal at the output end according to the second test image signal. A delay calculator is provided to detect a first time point at which the input end of the image processor receives the second test image signal, detect a second time point at which a signal on the output end of the image processor translates from the first processed test image signal to the second processed test image signal, and generate a first transmission delay according to the first time point and the second time point. The first time period occurs before the second time period, and the first test image signal and the second test image signal are different from each other.

In light of the above, in the embodiments of the invention, the transmission delay of the image signal generated in the projector is calculated according to the time points of providing different test image signals to the input end of the image processor and by determining the time point of translation occurring in the image signal on the output end of the image processor. In the embodiments of the invention, the time of generating the projection image can be adjusted according to the calculated transmission delay to improve the quality of image display.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
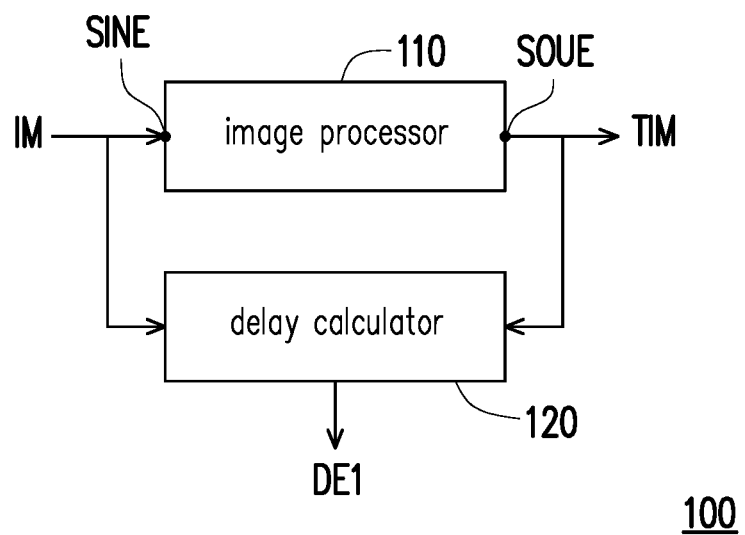
FIG. 1 is a schematic diagram illustrating a projector according to an embodiment of the invention.

Referring to FIG. 1, FIG. 1 is a schematic diagram illustrating a projector according to an embodiment of the invention. In the embodiment, a projector 100 may be a laser projector but is not limited hereto. In other embodiments, the light source of the projector 100 may also be a light-emitting diode or another suitable light source according to the design requirement. The projector 100 includes an image processor 110 and a delay calculator 120. The image processor 110 is configured to receive an image signal IM through an input end SINE and perform an image processing operation on the image signal IM to generate a processed image signal TIM at an output end SOUE. In the embodiment, when the image processor 110 receives a transmission delay detection signal, the projector 100 may enter a test mode. In the test mode, the projector 100 receives a first test image signal IM1 through the input end SINE during a first time period, and performs an image processing operation on the first test image signal IM1 to generate a first processed test image signal TIM1 at the output end SOUE. Next, during a second time period after the first time period, the input end SINE is changed to receive a second test image signal IM2, and an image processing operation is performed on the second test image signal IM2 to generate a second processed test image signal TIM2 at the output end SOUE. In the embodiment, the first test image signal IM1 and the second test image signal IM2 are different image signals.

In the embodiment, the image processing operation of the image processor 110 includes one or more types of image processing operations familiar to people skilled in the art, such as image blender operations and image scaler operations, but is not limited hereto. For example, the image processor 110 may be a central processing unit (CPU), a microcontroller, chip programmable controller, Application-Specific Integrated Circuit (ASIC), Field Programmable Gate Array (FPGA) or other similar components, or combinations of the above components.

On the other hand, the delay calculator 120 is coupled to the input end SINE and the output end SOUE of the image processor 110. In the test mode, the delay calculator 120 detects a first time point at which the input end SINE of the image processor 110 receives the second test image signal IM2 (i.e., detecting the time point at which the signal on the input end SINE of the image processor 110 translates from the first test image signal IM1 to the second test image signal IM2), and detects a second time point at which the signal on the output end SOUE of the image processor 110 translates from the first processed test image signal TIM1 to the second processed test image signal TIM2. In other words, the delay calculator 120 generates the first time point according to a grayscale value variation corresponding to the signal on the input end SINE of the image processor 110, and the delay calculator 120 generates the second time point according to a grayscale value variation corresponding to the signal on the output end SOUE of the image processor 110. Moreover, the delay calculator 120 calculates and generates a first transmission delay DE1 according to the first time point and the second time point. In brief, the delay calculator 120 can detect variations occurring in the signals on the input end SINE and the output end SOUE of the image processor 110 to obtain a transmission delay. For example, the delay calculator 120 may be a delay timer, ON/OFF Delay Relay timer, etc.

In the embodiment, the transmission delay of the image signal generated due to the image processing operation performed on the received image signal IM by the image processor 110 is substantially equal to the first transmission delay DE1. In the embodiment, the calculated first transmission delay DE1 may be N frame rates of the projector 100, wherein N is a real number greater than 1. In an embodiment, the first transmission delay DE1 is a first frame delay.

In the embodiment, the first test image signal IM1 may correspond to a display image having a first grayscale value, the second test image signal IM2 may correspond to a display image having a second grayscale value, and the first grayscale value and the second grayscale value are different from each other. Specifically, the first test image signal IM1 may correspond to a display image (e.g., a white image) having a lower grayscale value, and the second test image signal IM2 may correspond to a display image (e.g., a black image) having a higher grayscale value. However, in other embodiments, the first test image signal IM1 may also correspond to a display image having a higher grayscale value, and the second test image signal IM2 may also correspond to a display image having a lower grayscale value, which are not specifically limited herein.

Figure 2:
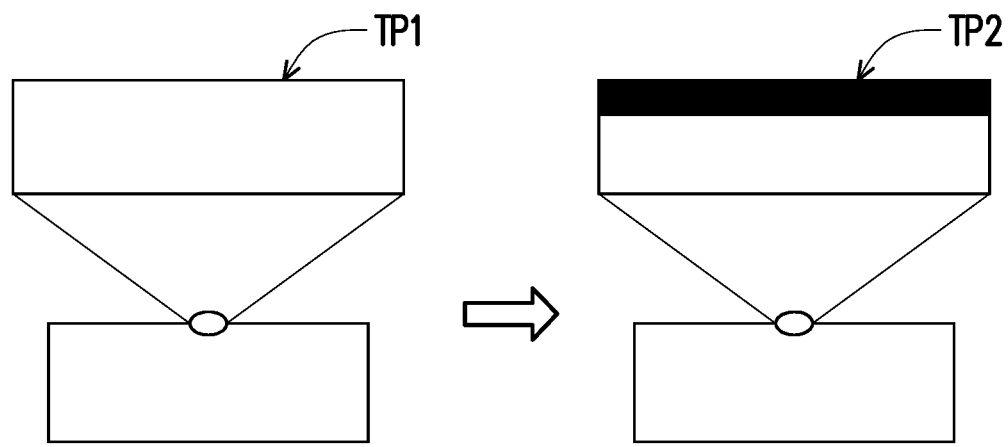
FIG. 2 is a schematic diagram illustrating a generation method of test image signals of the embodiment.
Figure 3:
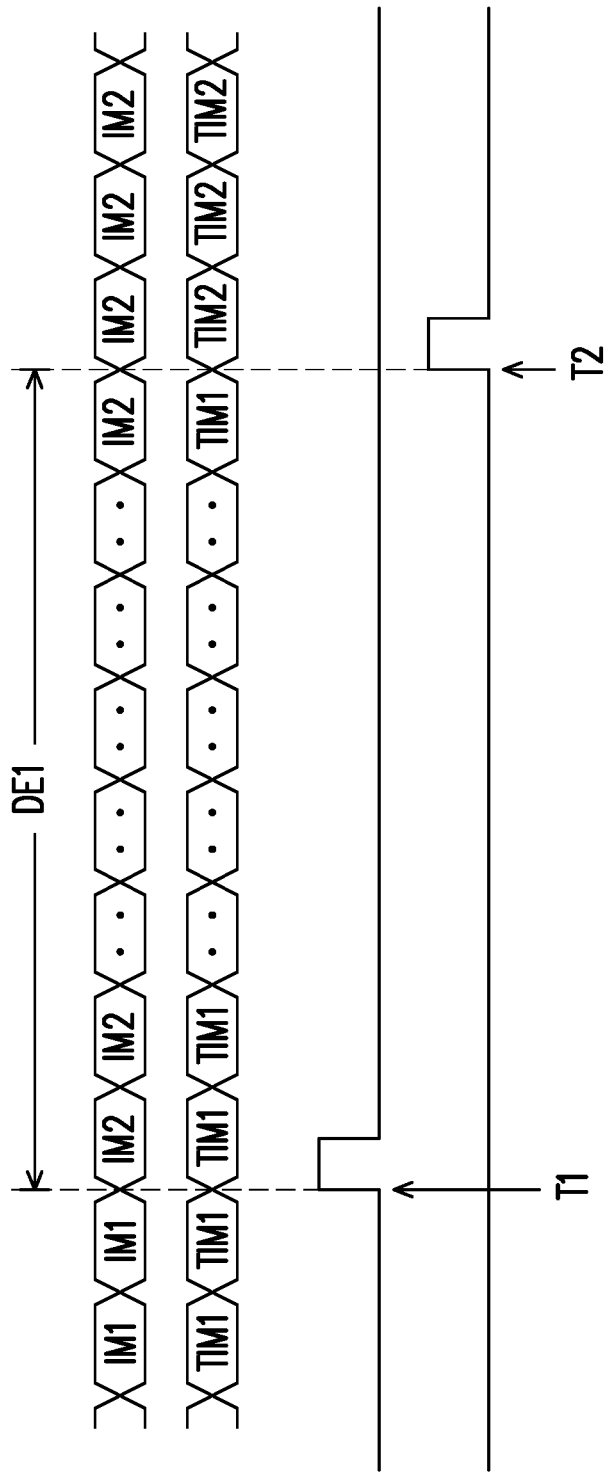
FIG. 3 is a waveform diagram illustrating a calculation method of a first transmission delay of the embodiment.

Examples are provided below to describe the first test image signal IM1 and the second test image signal IM2. Referring to FIG. 1, FIG. 2, and FIG. 3 at the same time, FIG. 2 is a schematic diagram illustrating a generation method of the test image signals of the embodiment, and FIG. 3 is a waveform diagram illustrating a calculation method of the first transmission delay of the embodiment. In the first time period in the test mode, the image processor 110 may receive the first test image signal IM1 corresponding to a fully white display image TP1. In the test mode, in the second time period after the first time period, the image processor 110 may receive the second test image signal IM2 corresponding to a black display image TP2. In the embodiment, the first time period may last for one or a plurality of frame rates, but the invention is not limited hereto. Accordingly, it is ensured that an unwanted image signal can be cleared by the first test image signal IM1, and it is further ensured that the second test image signal IM2 transmitted afterwards is correct. In the embodiment, the second time period is not greater than one frame rate, but the invention is not limited hereto.

In the embodiment, by transmitting the first test image signal IM1 corresponding to the fully white display image TP1 and continuously transmitting for several frame rates, the signal in the channel for transmitting image signals in the image processor 110 can be cleared. In the embodiment, the length of the first time period may be designed according to the transmission delay generated by the image processing operation performed by the image processor 110. Specifically, the length of the first time period is designed not to be less than a maximum transmission delay that may be generated by the image processing operation performed by the image processor 110 to ensure that the unwanted image signal can be cleared.

Compared to the first test image signal IM1, the transmission time of the second test image signal IM2 is not required to last for an extended period of time. Generally, the length of the second time period for transmitting the second test image signal IM2 is not greater than one frame rate, but the invention is not limited hereto.

In the embodiment, in the test mode, the image processor 110 first receives the first test image signal IM1 through the input end SINE and generates the corresponding first processed test image signal TIM1 at the output end SOUE. After the first time period lasting for one or more frame rates, the input end SINE of the image processor 110 is changed to receive the second test image signal IM2. At the same time, the delay calculator 120 may record the time point at which the image signal received by the input end SINE of the image processor 110 translates from the first test image signal IM1 to the second test image signal IM2 as the first time point T1, and starts a timing operation. Next, the delay calculator 120 may detect the time point at which the signal on the output end SOUE of the image processor 110 translates from the first processed test image signal TIM1 to the second processed test image signal TIM2 and record the time point as the second time point T2. Moreover, the delay calculator 120 stops the timing operation when the second time point T2 occurs. Accordingly, the delay calculator 120 may generate the first transmission delay DE1 according to a timing result of the timing operation. In brief, as shown in FIG. 3, in the embodiment, the instant at which the test signal received by the input end SINE translates from the first test image signal IM1 to the second test image signal IM2 is recorded as the first time point T1, the instant at which the processed test signal received by the output end SOUE translates from the first processed test image signal TIM1 to the second processed test image signal TIM2 is recorded as the second time point T2, and the time difference between the first time point T1 and the second time point T2 is the first transmission delay DE1.

In the timing operation above, the delay calculator 120 may be disposed with a timer to perform the timing operation based on the first time point T1 and the second time point T2 according to a relatively high-frequency clock signal. In the embodiment, the timer may be implemented according to a hardware framework of a timer familiar to people skilled in the art and is not specifically limited herein. In the embodiment, the frequency of the clock signal may be set according to a tolerance of the first transmission delay DE1. In the embodiment, when the tolerance of the first transmission delay DE1 is smaller, the frequency of the clock signal may be set at a higher frequency.

Nonetheless, the first test image signal IM1 and the second test image signal IM2 are not necessarily respectively a white or black image. In other embodiments, the first test image signal IM1 and the second test image signal IM2 may respectively correspond to display images having different features, and the delay calculator 120 may generate the first time point T1 and the second time point T2 by identifying the difference in the features.

In the embodiment, the projector 100 may compare the first transmission delay DE1 to a reference value and adjust a time point of generating the processed image signal TIM according to the comparison result. For example, the reference value may be an audio signal transmission delay of an audio-visual signal to be played by the projector 100. When the audio signal transmission delay is overly large, the projector 100 may postpone the time point of generating the processed image signal TIM according to the comparison result of the first transmission delay DE1 and the reference value. Similarly, when the image processing transmission delay is overly large, the projector 100 may advance the time point of generating the processed image signal TIM according to the comparison result of the first transmission delay DE1 and the reference value. Accordingly, the purpose of audio-video synchronization can be achieved. In other embodiments, the reference value may also be first transmission delays of other projectors. By comparing the first transmission delays of a plurality of projectors, the projector 100 may adjust the time point of generating the processed image signal TIM and cause the time points of generating the processed image signals TIM of the plurality of projectors to be identical to achieve the effect of video image synchronization.

Figure 4:
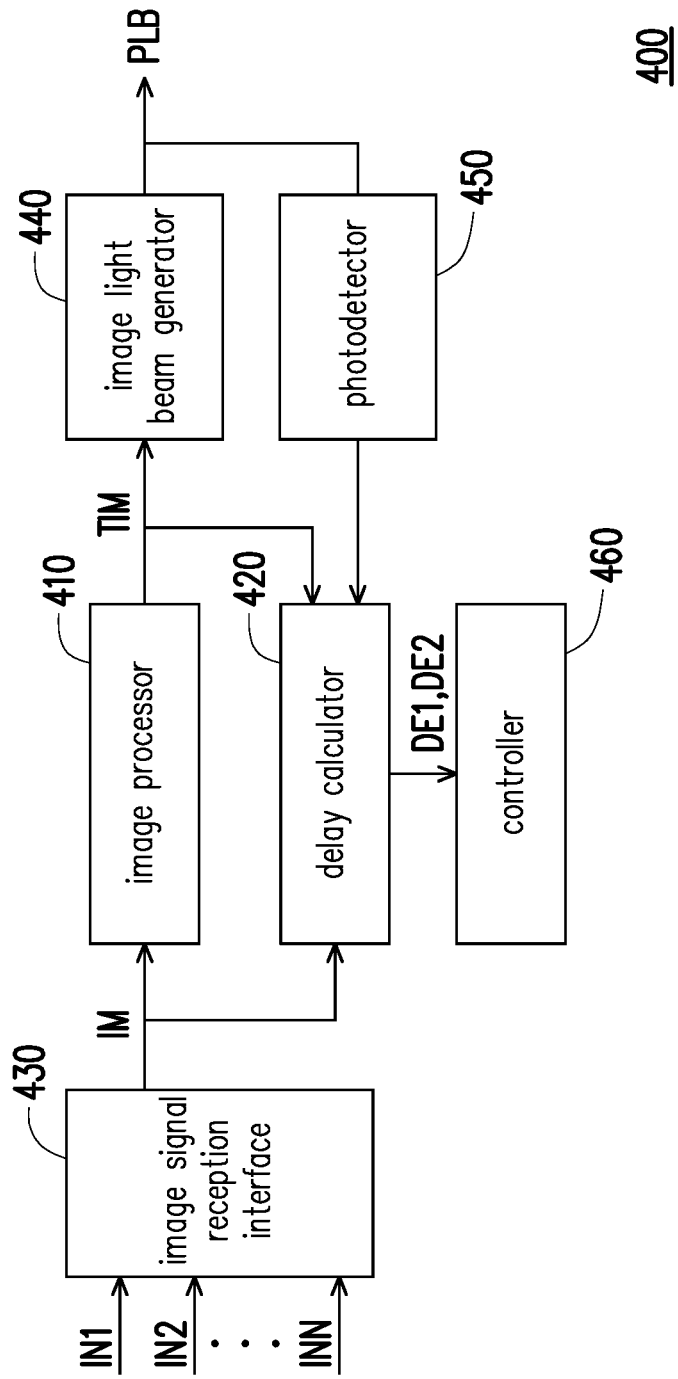
FIG. 4 is a schematic diagram illustrating a projector according to another embodiment of the invention.

Referring to FIG. 4, FIG. 4 is a schematic diagram illustrating a projector according to another embodiment of the invention. A projector 400 includes an image processor 410, a delay calculator 420, an image signal reception interface 430, an image light beam generator 440, and a controller 460. The image signal reception interface 430 receives image signals IN1 to INN in the same or different formats through a plurality of channels. The image processor 410 receives an image signal IM transmitted by the image signal reception interface 430 and performs an image processing operation on the image signal IM to generate a processed image signal TIM. The image light beam generator 440 is coupled to an output end of the image processor 410, receives the processed image signal TIM to generate an image light beam PLB according to the processed image signal TIM, and generates a projection image by projecting the image light beam PLB on a projection screen.

The delay calculator 420 is coupled to the image processor 410 and, in a test mode, calculates a first transmission delay DE1 according to a variation in the image signals on the input end and the output end of the image processor 410.

On the other hand, in the test mode, the image light beam generator 440 may generate different test image light beams PLB1 and PLB2 corresponding to a first test image signal IM1 and a second test image signal IM2. In the embodiment, the image light beam generator 440 generates the test image light beam PLB2 according to a second processed test image signal TIM2 and generates the test image light beam PLB1 according to the first processed test image signal TIM1. In the embodiment, the projector 400 further includes a photodetector 450. In the test mode, the photodetector 450 may detect the test image light beams PLB1 and PLB2 generated by the image light beam generator 440 and detects a time point at which the output of the image light beam generator 440 translates from the test image light beam PLB1 to the test image light beam PLB2 to allow the delay calculator 420 to generate a third time point. In brief, in the embodiment, the time point at which the image state variation occurs in the test image light beam (e.g., translating from the test image light beam PLB1 to the test image light beam PLB2) is the third time point. Accordingly, in the test mode, the projector 400 can generate the test image light beams PLB1/PLB2 according to the first processed test image signal TIM1 and the second processed test image signal TIM2 and can generate the third time point according to a time point of brightness variation of the test image light beams PLB1/PLB2.

In the embodiment above, as an example, the first test image signal IM1 is the display image corresponding to the white image and the second test image signal IM2 is the display image corresponding to the black image. The photodetector 450 may generate the third time point according to the brightness variation of the image light beam PLB. In other words, the delay calculator 420 may generate the third time point according to the time point at which the brightness of the image light beam PLB detected by the photodetector 450 decreases.

The photodetector 450 may be disposed inside or outside the projector 400 and is disposed on a transmission path of the test image light beams PLB1 and PLB2. In the embodiment, the photodetector 450 is disposed, for example, inside the projector 400 to detect the test image light beams PLB1 and PLB2 provided by the image light beam generator 440. In the embodiment, the photodetector 450 may also be an image capture device that captures the projection images generated by the test image light beams PLB1 and PLB2 as the basis for generating the third time point.

In the embodiment, the delay calculator 420 is coupled to the photodetector 450 and generates a second transmission delay DE2 according to the third time point and the second time point. In the embodiment, the second transmission delay DE2 is calculated according to the third time point with respect to the second time point (e.g., the time difference between the third time point and the second time point). In brief, in the test mode, the image light beam generator 440 generates the test image light beams PLB1/PLB2 according to the first processed test image signal TIM1 and the second processed test image signal TIM2. In the test mode, the photodetector 450 detects the image state variation occurring in the test image light beams PLB1/PLB2. The delay calculator 420 generates the second transmission delay DE2 according to the second time point and the third time point at which the image state variation occurs in the test image light beams PLB1/PLB2. In an embodiment, the second transmission delay DE2 is a second frame delay.

On the other hand, the controller 460 is coupled to the delay calculator 420 and receives the first transmission delay DE1 and the second transmission delay DE2. The controller 460 may obtain the complete transmission delay generated in the period from image data reception to image light beam generation of the projector 400 according to the first transmission delay DE1 and the second transmission delay DE2.

Figure 5:
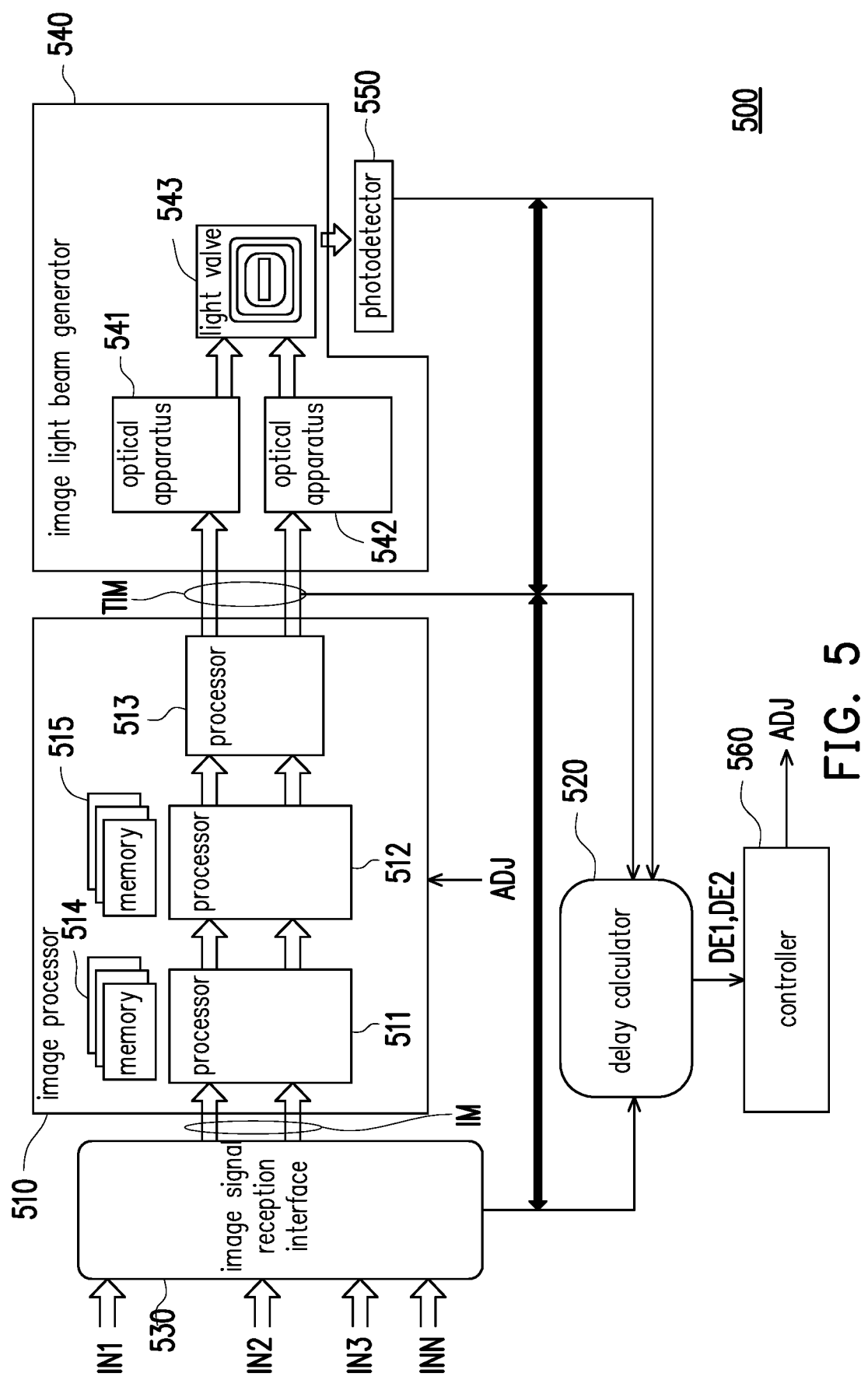
FIG. 5 is a schematic diagram illustrating a projector according to another embodiment of the invention.

Referring to FIG. 5, FIG. 5 is a schematic diagram illustrating a projector according to another embodiment of the invention. In the embodiment, a projector 500 includes an image processor 510, a delay calculator 520, an image signal reception interface 530, an image light beam generator 540, a photodetector 550, and a controller 560. The image signal reception interface 530 receives image signals IN1 to INN in the same or different formats through a plurality of channels. The image processor 510 receives an image signal IM transmitted by the image signal reception interface 530 and performs an image processing operation on the image signal IM to generate a processed image signal TIM. The image light beam generator 540 is coupled to an output end of the image processor 510 and receives the processed image signal TIM to generate an image light beam according to the processed image signal TIM. In an embodiment, the image light beam generator 540 may further include a projection lens (not illustrated) to generate a projection image by projecting the image light beam on a projection screen.

In the embodiment, the image processor 510 includes a plurality of processors 511, 512, and 513 to perform an image processing operation on the received image signal. In the embodiment, the image processor 510 also includes a plurality of memories 514, 515 to allow the processors 511, 512, and 513 to perform a data buffering operation.

In the embodiment, the image light beam generator 540 includes optical apparatuses 541, 542 and a light valve 543. In the embodiment, the light valve 543 may be a digital micromirror device (DMD), a liquid crystal on silicon (LCoS), or a liquid crystal display panel (LCD panel) but is not limited hereto. The optical apparatuses 541 and 542 are configured to generate light beams of the same or different colors, and the light valve 543 is configured to generate an image light beam. In an embodiment, the photodetector 550 is disposed, for example, inside the projector 500 and detects, for example, the image light beam provided by the light valve 543 of the image light beam generator 540, but the invention is not limited hereto. In another embodiment, the photodetector 550 is disposed, for example, outside the projector 500 and detects, for example, an image light beam provided by a projection lens (not illustrated) of the image light beam generator 540, but the invention is still not limited hereto.

According to the embodiment above, the transmission delay generated by performing image processing on the image signal in the image processor 510 is the first transmission delay DE1, and the transmission delay generated by converting the image signal output by the image processor 510 into the image in the image light beam generator 540 is the second transmission delay DE2. Moreover, in the embodiment, the first transmission delay DE1 and/or the second transmission delay DE2 may be directly read by a user through on-screen display (OSD) or an engineering mode, but the invention is not limited hereto. In an embodiment, the controller 560 may generate a delay control signal ADJ according to the reference value, the first transmission delay DE1, and the second transmission delay DE2. The controller 560 transmits the delay control signal ADJ to the image processor 510 and has the image processor 510 adjust, according to the delay control signal ADJ, the lengths of the first transmission delay DE1 and the second transmission delay DE2 that are likely to be generated. In an embodiment, the controller 560 may generate the delay control signal ADJ according to the reference value and the first transmission delay DE1. The controller 560 transmits the delay control signal ADJ to the image processor 510 and has the image processor 510 adjust, according to the delay control signal ADJ, the length of the first transmission delay DE1 that is likely to be generated. In an embodiment, the controller 560 may generate the delay control signal ADJ according to the reference value and the second transmission delay DE2. The controller 560 transmits the delay control signal ADJ to the image processor 510 and has the image processor 510 adjust, according to the delay control signal ADJ, the length of the second transmission delay DE2 that is likely to be generated. Accordingly, the cases of unsynchronized video and audio and unsynchronized display of a plurality of projectors can be adjusted/corrected to achieve effects of audio-video synchronization and synchronized display of the plurality of projectors.

When implemented as hardware, the processors 511 to 513, the delay calculator 520, and the controller 560 may be processors having computational capacity. Alternatively, the processors 511 to 513, the delay calculator 520, and the controller 560 may also be hardware circuits designed through a hardware description language (HDL) or any other design methods of digital circuits familiar to people skilled in the art and may be implemented by field programmable gate arrays (FPGA), complex programmable logic devices (CPLD), or application-specific integrated circuits (ASIC). Moreover, the memories 514, 515 may be various types of random access memories (RAM), read-only memories (ROM), etc., but are not limited hereto.

Figure 6:
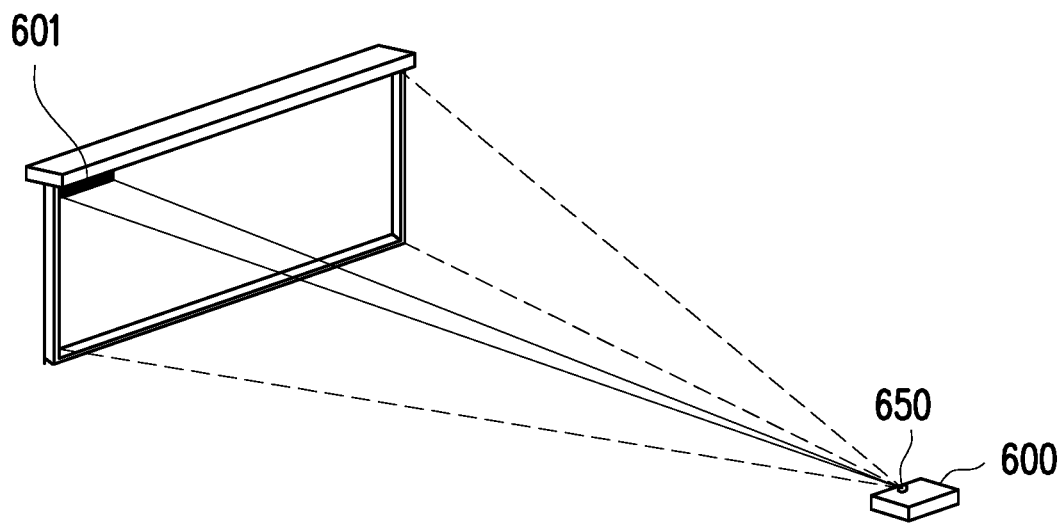
FIG. 6 is a schematic diagram illustrating an implementation of a photodetector of the embodiment.

Referring to FIG. 6, FIG. 6 is a schematic diagram illustrating an implementation of a photodetector of the embodiment. In FIG. 6, a photodetector 650 is disposed on a projector 600. The photodetector 650 is an image capture device (an image capture device familiar to people skilled in the art, e.g., a camera, a video recorder, etc.) and is configured to capture a projection image generated by the projector 600. In the embodiment, the projector 600 generates a projection image including a feature image 601 corresponding to the second test image signal. When the third time point is calculated, the projector 600 may generate the third time point according to the time point at which the feature image 601 occurs in the image captured by the photodetector 650. Here, the feature image 601 may be a specific pattern, text, or a combination of the two and is not specifically limited herein.

Figure 7:
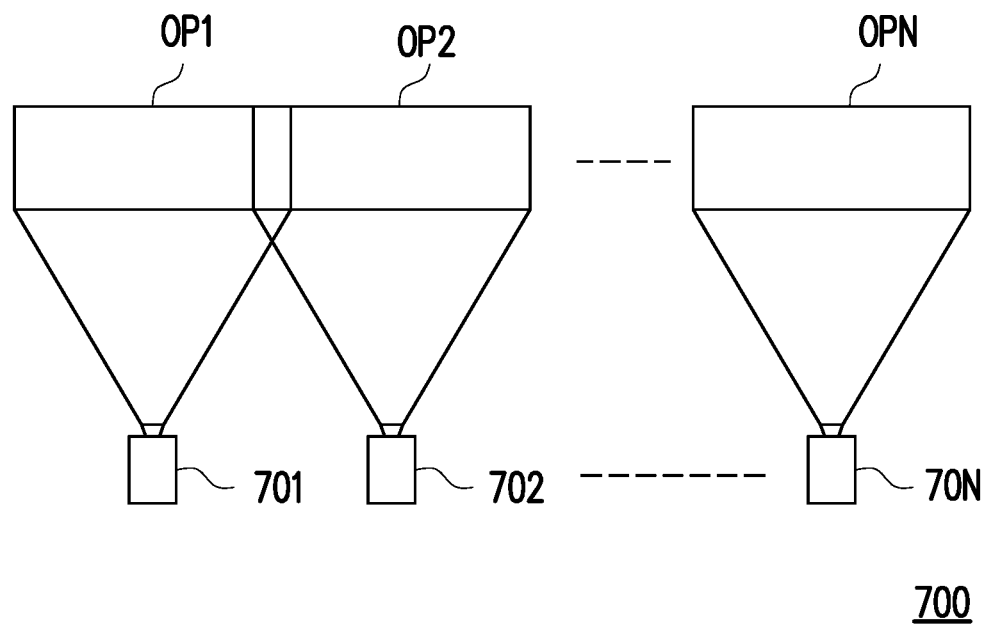
FIG. 7 is a schematic diagram illustrating a projecting system of the embodiment.

Referring to FIG. 7, FIG. 7 is a schematic diagram illustrating a projecting system of the embodiment. A projecting system 700 includes a plurality of projectors 701 to 70N. The projectors 701 to 70N respectively generate a plurality of divided images OP1 to OPN. The divided images OP1 to OPN may be combined into a merged image.

In the embodiment, each of the projectors 701 to 70N may be implemented as the projector 100, 400, or 500 described in the foregoing embodiments. In the embodiment, the projectors 701 to 70N respectively include a plurality of controllers (not illustrated). One of the controllers may be set as a master controller to generate delay control signals according to a plurality of first transmission delays generated by the projectors 701 to 70N or generate delay control signals according to the plurality of first transmission delays and a plurality of second transmission delays generated by the projectors 701 to 70N. With the delay control signals, the divided images OP1 to OPN respectively generated by the projectors 701 to 70N can be synchronously displayed, and the display quality can be improved.

The setting of the master controller may be selected and configured by the user. Alternatively, the controller disposed in the projector 701 that generates the first divided image OP1 may be preset as the master controller.

Moreover, in the projecting system 700, a master control console (not illustrated) may also be additionally disposed to function as the control mechanism of the projectors 701 to 70N, but the invention is not limited hereto. The master control console may be a server that functions as a supply source of image signals.

Figure 8:
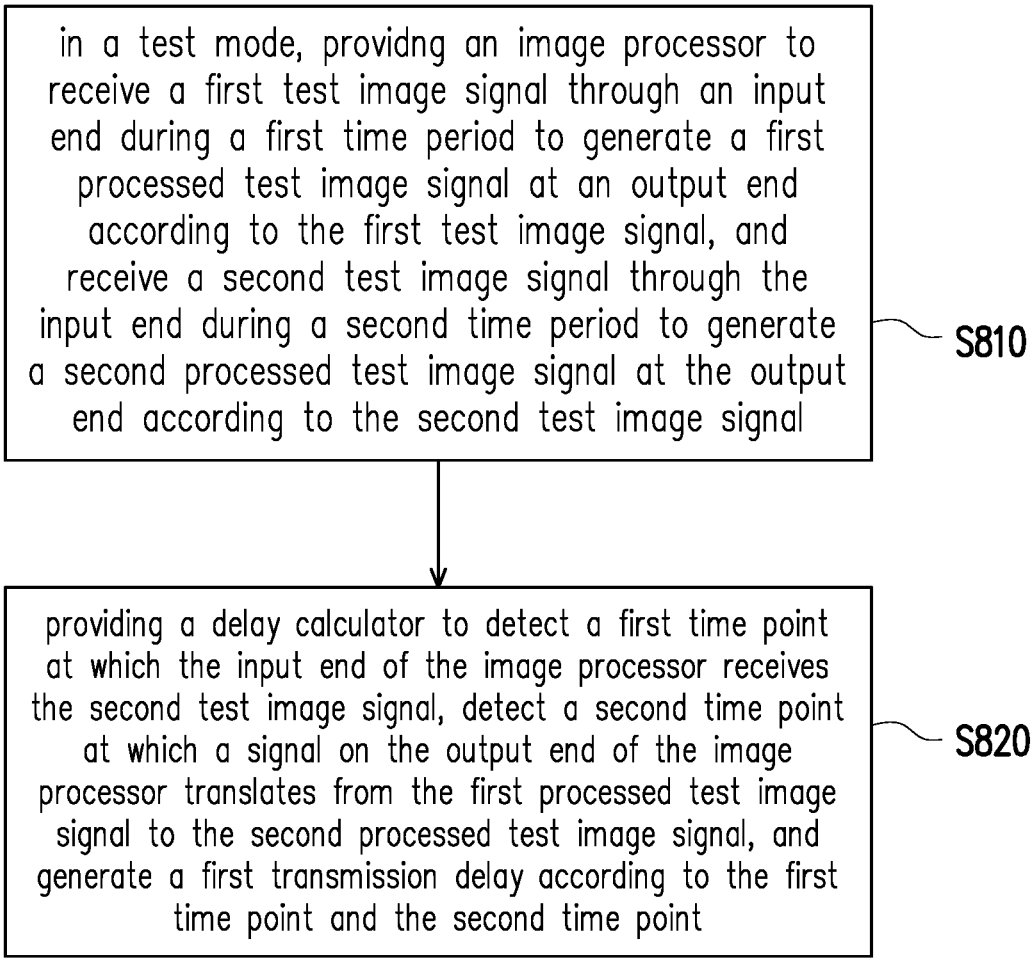
FIG. 8 is a flowchart illustrating a transmission delay detection method according to an embodiment of the invention.

Referring to FIG. 8, FIG. 8 is a flowchart illustrating a transmission delay detection method according to an embodiment of the invention. A transmission delay detection method of FIG. 8 is adapted for a projector. In step S810, in a test mode, an image processor is provided to receive a first test image signal through an input end during a first time period to generate a first processed test image signal at an output end according to the first test image signal, and receive a second test image signal through the input end during a second time period to generate a second processed test image signal at the output end according to the second test image signal. Next, in step S820, a delay calculator is provided to detect a first time point at which the input end of the image processor receives the second test image signal, detect a second time point at which a signal on the output end of the image processor translates from the first processed test image signal to the second processed test image signal, and generate a first transmission delay according to the first time point and the second time point. Specifically, the first time period occurs before the second time period, and the first test image signal and the second test image signal are different from each other.

Implementation details of the steps above have been described in the foregoing embodiments and examples and shall not be repeatedly described here.

In summary of the above, in the projector of the embodiments of the invention, by disposing the delay calculator to detect the variation state of the image signals on the input end and the output end of the image processor, the transmission delay generated by the image processor can be calculated. Accordingly, the projector can further perform adjustment operations on the time point of generating the projection image according to the transmission delay to achieve the function of image synchronization and/or audio-video synchronization.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector comprising:
   an image processor, in a test mode, adapted to receive a first test image signal through an input end during a first time period to generate a first processed test image signal at an output end according to the first test image signal, and adapted to receive a second test image signal through the input end during a second time period to generate a second processed test image signal at the output end according to the second test image signal; and
   a delay calculator, coupled to the input end and the output end of the image processor, adapted to detect a first time point at which the input end of the image processor receives the second test image signal, adapted to detect a second time point at which a signal on the output end of the image processor translates from the first processed test image signal to the second processed test image signal, and generate a first transmission delay according to the first time point and the second time point,
   wherein the first time period occurs before the second time period, and the first test image signal and the second test image signal are different from each other.

2. The projector according to claim 1, further comprising:
   an image light beam generator, coupled to the output end of the image processor, in the test mode, adapted to generate a test image light beam according to the first processed test image signal and the second processed test image signal; and
   a photodetector, coupled to the delay calculator, in the test mode, adapted to detect an image state variation occurring in the test image light beam,
   wherein the delay calculator generates a second transmission delay according to the second time point and a third time point at which the image state variation occurs in the test image light beam.

3. The projector according to claim 2, further comprising:
   a controller, coupled to the delay calculator, adapted to generate a delay control signal according to the first transmission delay, the second transmission delay, and a reference value,
   wherein the delay control signal is transmitted to the image processor to adjust an image signal transmission delay of the image processor.

4. The projector according to claim 3, wherein the reference value is set according to an audio signal transmission delay.

5. The projector according to claim 1, wherein the first test image signal corresponds to a display image having a first grayscale value, the second test image signal corresponds to a display image having a second grayscale value, and the first grayscale value and the second grayscale value are different from each other.

6. The projector according to claim 5, wherein the delay calculator adapted to generate the second time point according to a grayscale value variation corresponding to the signal on the output end of the image processor.

7. The projector according to claim 5, wherein, in the test mode, the projector adapted to generate a test image light beam according to the first processed test image signal and the second processed test image signal, and adapted to generate a third time point according to a time point of brightness variation of the test image light beam.

8. The projector according to claim 2, wherein the photodetector is an image capture device, and in the test mode, adapted to capture a plurality of projection images generated by the test image light beam and generate the third time point according to the plurality of projection images.

9. The projector according to claim 1, wherein the first time period comprises at least one frame rate, and the second time period comprises at most one frame rate.

10. A projecting system comprising
    a plurality of projectors, adapted to respectively generate a plurality of divided images, wherein the plurality of divided images are combined into a merged image, and each of the projectors comprises an image processor and a delay calculator, wherein
    in a test mode, the image processor adapted to receive a first test image signal through an input end during a first time period to generate a first processed test image signal at an output end according to the first test image signal, and adapted to receive a second test image signal through the input end in during second time period to generate a second processed test image signal at the output end according to the second test image signal, and
    the delay calculator, coupled to the input end and the output end of the image processor, adapted to detect a first time point at which the input end of the image processor receives the second test image signal, detect a second time point at which a signal on the output end of the image processor translates from the first processed test image signal to the second processed test image signal, and generate a first transmission delay according to the first time point and the second time point,
    wherein the first time period occurs before the second time period, and the first test image signal and the second test image signal are different from each other; and
    a controller, coupled to the plurality of projectors, adapted to generate a delay control signal according to the first transmission delay generated by each of the projectors, and adjust an image signal transmission delay of each of the image processors according to the delay control signal.

11. The projecting system according to claim 10, wherein each of the projectors further comprises:
an image light beam generator, coupled to the output end of the image processor, in the test mode, adapted to generate a test image light beam according to the first processed test image signal and the second processed test image signal; and
a photodetector, coupled to the delay calculator, in the test mode, adapted to detect an image state variation occurring in the test image light beam,
wherein the delay calculator adapted to generate a second transmission delay according to the second time point and a third time point at which the image state variation occurs in the test image light beam.

12. The projecting system according to claim 11, wherein each of the photodetectors is an image capture device, and in the test mode, adapted to capture a plurality of projection images generated by the corresponding test image light beam and generate the plurality of corresponding third time points according to the plurality of corresponding projection images.

13. The projecting system according to claim 10, wherein each of the first test image signals corresponds to a display image having a first grayscale value, each of the second test image signals corresponds to a display image having a second grayscale value, and the plurality of first grayscale values and the plurality of second grayscale values are different from each other.

14. The projecting system according to claim 13, wherein each of the delay calculators adapted to generate the corresponding second time point according to a grayscale value variation corresponding to the signal on the output end of the corresponding image processor.

15. The projecting system according to claim 13, wherein, in the test mode, each of the projectors adapted to generate a test image light beam according to the corresponding first processed test image signal and the corresponding second processed test image signal, and adapted to generate a third time point according to a time point of brightness variation of the corresponding test image light beam.

16. A transmission delay detection method comprising:
in a test mode, providing an image processor to receive a first test image signal through an input end in during first time period to generate a first processed test image signal at an output end according to the first test image signal, and receive a second test image signal through the input end during a second time period to generate a second processed test image signal at the output end according to the second test image signal; and
providing a delay calculator to detect a first time point at which the input end of the image processor receives the second test image signal, detect a second time point at which a signal on the output end of the image processor translates from the first processed test image signal to the second processed test image signal, and generate a first transmission delay according to the first time point and the second time point,
wherein the first time period occurs before the second time period, and the first test image signal and the second test image signal are different from each other.

17. The transmission delay detection method according to claim 16, further comprising:
providing an image light beam generator to, in the test mode, generate a test image light beam according to the first processed test image signal and the second processed test image signal;
providing a photodetector to, in the test mode, detect an image state variation occurring in the test image light beam; and
providing the delay calculator to generate a second transmission delay according to the second time point and a third time point at which the image state variation occurs in the test image light beam.

18. The transmission delay detection method according to claim 17, further comprising:
providing a controller to generate a delay control signal according to the first transmission delay, the second transmission delay, and a reference value,
wherein the delay control signal is transmitted to the image processor to adjust an image signal transmission delay of the image processor.

19. The transmission delay detection method according to claim 17, wherein the step of providing the photodetector to, in the test mode, detect the test image light beam to generate the third time point of the image state variation comprises:
in the test mode, capturing a plurality of projection images generated by the test image light beam and generating the third time point according to the plurality of projection images.

20. The transmission delay detection method according to claim 16, wherein the first test image signal corresponds to a display image having a first grayscale value, the second test image signal corresponds to a display image having a second grayscale value, and the first grayscale value and the second grayscale value are different from each other.

21. The transmission delay detection method according to claim 20, wherein the step of detecting the second time point at which the signal on the output end of the image processor translates from the first processed test image signal to the second processed test image signal comprises:
providing the delay calculator to generate the second time point according to a grayscale value variation corresponding to the signal on the output end of the image processor.

22. The transmission delay detection method according to claim 20, further comprising:
in the test mode, generating a test image light beam according to the first processed test image signal and the second processed test image signal, and generating a third time point according to a time point of brightness variation of the test image light beam.

23. The transmission delay detection method according to claim 16, wherein the first time period comprises at least one frame rate, and the second time period comprises at most one frame rate.

* * * * *